No. 754,736. PATENTED MAR. 15, 1904.
R. A. ANTHONY.
PHOTOGRAPHIC FILM.
APPLICATION FILED OCT. 8, 1903.
NO MODEL.
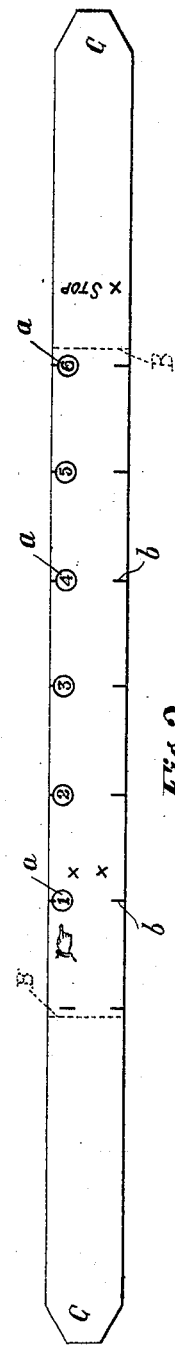
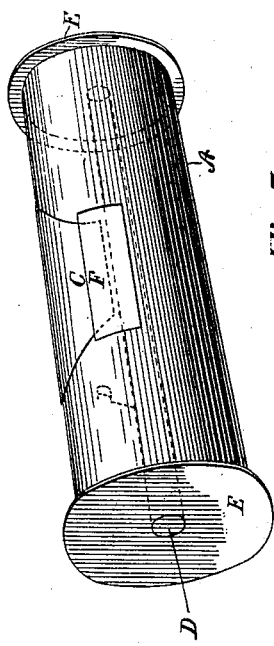
WITNESSES:
Nora M. Donebach
Martin Hauger.
Richard A. Anthony INVENTOR
BY
Phillips Abbott
ATTORNEY No. 754,736. Patented March 15, 1904.

UNITED STATES PATENT OFFICE.

RICHARD A. ANTHONY, OF NEW YORK, N. Y.

PHOTOGRAPHIC FILM.

SPECIFICATION forming part of Letters Patent No. 754,736, dated March 15, 1904.

Application filed October 8, 1903. Serial No. 176,181. (No model.)

*To all whom it may concern:*

Be it known that I, RICHARD A. ANTHONY, a citizen of the United States, and a resident of the borough of Manhattan, city, county, and State of New York, have invented a new and useful Improvement in Photographic Films, of which the following is a full, clear, and exact description, reference being had to the accompanying drawings, in which—

Figure 1 illustrates an edgewise view of the opaque paper and its sensitized coating. Fig. 2 illustrates a plan view of the back of the opaque paper, showing the numerals and indications for exposures and cross-cutting. Fig. 3 illustrates the spool filled or loaded with the sensitized paper illustrated in Fig. 1. Fig. 4 illustrates an edgewise view of a modified construction.

I take a strip of smooth-surfaced paper of any suitable kind. The paper should be opaque or treated so that the light cannot pass through to injuriously affect the sensitized coating B, hereinafter to be described. On the back of this strip of paper I produce in suitable colored ink numerals or marks "a" to designate where to make the exposures and also indications "b" where to cross-cut between them. I then sensitize the opposite face of the paper with materials photographically sensitive to the action of light—such, for example, as the well-known gelatino-argentic emulsion, shown, as above stated, at B. Any other suitable solution or emulsion may, however, be employed, and I vary the nature of the sensitive material and the proportions and manner of mixing or combining the same according as I desire to obtain greater or less sensitiveness to the action of light.

I prefer that the ends C C (see Fig. 2) of the opaque paper shall both extend sufficiently beyond the sensitized coating to make several convolutions or laps around it when they are wound together upon a spool, as hereinafter described, so that the sensitized material shall be protected against the action of light. In winding the strip of opaque paper, with its sensitized coating, upon the spool the sensitized side of the paper is turned inwardly toward the axis D of the spool. The spool is to be provided with flanges E, one at each end of the spool center or axis D, which is to be substantially as long as the width of the opaque paper, so that it will fit snugly between the flanges, and thus prevent the entrance of light at the edges, which would injuriously affect the sensitive surface.

As above described, in winding the opaque paper and sensitized coating upon the spool the first winding consists of several convolutions or laps of the opaque paper. Then the opaque paper and its sensitized coating will be wound up together, the sensitized coating being, as stated, inward toward the axis of the spool, and finally there will be several laps or convolutions of the outer end of the opaque paper, which in a manner now well known will protect the coiled-up sensitive surface from the action of the light. I fasten the outer extremity of the opaque paper with any suitable gummed paster F.

I prefer to print the marks upon this paper or fabric and sensitize the same originally in wide bands and in long rolls and then cut the resulting product into suitable lengths and slit it into suitable widths to fit spools of various sizes, and thus produce the product in cartridge form suitable to fit various makes and sizes of cameras.

Instead of confining the sensitized coating to a space between the naked or uncoated ends of the opaque fabric I may coat the entire strip of fabric with the sensitized material; but, if so, some waste is necessitated.

In Fig. 4 I illustrate a modified construction of the invention. In it the sensitized coating B is applied to the fabric A the same as before; but in this construction the fabric need not be opaque. Any fabric having a suitably-smooth surface may be used, because in this instance another sheet or strip of opaque material G is used in conjunction with the fabric A and its sensitized coating B, and the ends of the paper G extend beyond the sensitively-coated fabric A, so as to afford the lapping terminals when wound upon the spool, as above described. The fabric A is of course suitably attached to the paper G, and the indications for the exposures and places for cross-cutting are made upon the back of the paper G.

The above-described product or article of manufacture is to be used in conjunction with the now well-known process discovered by Professor Oswald, a German chemist, for printing negatives by means of so-called catalytic reaction, which has been published in various scientific, photographic, and other publications.

I claim—

1. A flanged spool having wound upon it a strip of opaque material having directly applied and permanently attached to one side thereof a coating of photographically-sensitive material and having designations on the other side.

2. A flanged spool having wound upon it a strip of opaque material having directly applied and permanently attached to one side thereof a coating of photographically-sensitive material and having designations on the other side, the ends of the opaque material extending beyond the part of the sensitive coating upon which the exposures are to be made.

3. A flanged spool having wound upon it a strip of opaque material, one side of which is partly covered with a coating of photographically-sensitive material permanently attached thereto and applied directly thereon, leaving uncoated ends of sufficient length to protect the photographically-sensitive coating from the action of light when coiled upon the flanged spool, and designations on the other or back side of the opaque material.

4. A flanged spool having wound upon it a strip of opaque material having designations on one side and having attached to its other side a shorter strip of paper having photographically-sensitive material directly applied thereon and permanently attached thereto.

5. As a new article of manufacture a sheet or strip of opaque material having a coating of photographically - sensitive material directly applied on one side thereof and permanently attached thereto and having designations on the back or uncoated side.

In testimony whereof I have signed my name to this specification in the presence of two subscribing witnesses.

RICHARD A. ANTHONY.

Witnesses:
F. A. ANTHONY,
L. S. VAN NOSTRAND.